US007993062B2

(12) United States Patent
Plasse

(10) Patent No.: US 7,993,062 B2
(45) Date of Patent: Aug. 9, 2011

(54) COMBINATION THRUST FLANGE AND THRUST PLATE

(75) Inventor: Ernest W. Plasse, Mystic, CT (US)

(73) Assignee: Davis-Standard, LLC, Pawcatuck, CT (US)

( * ) Notice: Subject to any disclaimer, the term of this patent is extended or adjusted under 35 U.S.C. 154(b) by 0 days.

(21) Appl. No.: 10/012,980

(22) Filed: Nov. 5, 2001

(65) Prior Publication Data

US 2002/0071620 A1 Jun. 13, 2002

Related U.S. Application Data

(60) Provisional application No. 60/246,394, filed on Nov. 7, 2000.

(51) Int. Cl.
*F16C 33/58* (2006.01)
*F16C 19/10* (2006.01)
(52) U.S. Cl. .................. 384/622; 384/590; 384/618
(58) Field of Classification Search .............. 384/590, 384/609, 615, 618, 621, 622, 455; 366/77, 366/78, 83
See application file for complete search history.

(56) References Cited

U.S. PATENT DOCUMENTS

| | | | | |
|---|---|---|---|---|
| 2,030,104 | A * | 2/1936 | Eksergian | 72/236 |
| 2,118,760 | A * | 5/1938 | Ernst | 384/455 |
| 2,659,305 | A * | 11/1953 | Giori | 101/175 |
| 3,375,549 | A * | 4/1968 | Geyer | 366/83 |
| 3,414,341 | A | 12/1968 | Murphy | |
| 3,795,456 | A * | 3/1974 | Schafer | 415/72 |
| 3,923,290 | A * | 12/1975 | Tillis | 366/77 |
| 3,934,956 | A * | 1/1976 | Pitner | 384/455 |
| 4,033,556 | A | 7/1977 | Anders | |
| 4,042,284 | A | 8/1977 | Coster | |
| 4,124,256 | A * | 11/1978 | de Senneville | 384/455 |
| 4,304,539 | A | 12/1981 | Hagiwara et al. | |
| 4,517,858 | A | 5/1985 | Schafer | 475/337 |
| 4,859,166 | A | 8/1989 | Hamada et al. | |
| 5,150,973 | A * | 9/1992 | Masur et al. | 384/448 |
| 5,261,750 | A * | 11/1993 | Eckhardt et al. | 384/455 |
| 5,545,024 | A | 8/1996 | Iwata et al. | |
| 5,641,227 | A * | 6/1997 | Geyer | 366/78 |
| 5,770,906 | A * | 6/1998 | Hazelton et al. | 310/90 |
| 6,485,188 | B1 * | 11/2002 | Dougherty | 384/589 |
| 2005/0216084 | A1 * | 9/2005 | Fleischmann et al. | 623/17.11 |

* cited by examiner

Primary Examiner — Melody M Burch
(74) Attorney, Agent, or Firm — Michaud-Kinney Group LLP

(57) ABSTRACT

A rotating combination thrust plate and thrust shaft flange (10), and a thrust bearing assembly (40) incorporating the rotating flange plate combination (10), in which the rotating flange plate combination (10) has a generally cylindrical body portion (22) which has a rotating base surface (24) and a lateral surface (23), a frustoconical body portion (29) which has a frustoconical surface (28), and a bore (12) extending through the cylindrical and frustoconical body portions (22 and 29) and having a first bore section (14) and a second bore section (16) wherein the second bore section (16) is adjacent the rotating base surface (24) and has a smaller diameter then the first bore section (14). The first and second bore sections meet at a junction (18) defining a lip (21) which is designed to support a complimentary lip (42) of a bore shaft (20) thereby restricting the movement of the bore shaft (20) in the direction of thrust in an extruder.

12 Claims, 5 Drawing Sheets

COMBINATION THRUST FLANGE AND THRUST PLATE

CROSS REFERENCE TO RELATED APPLICATIONS

This application claims the benefit of U.S. Provisional Application Ser. No. 60/246,394 filed on Nov. 7, 2000, which is incorporated herein by reference in its entirety.

FIELD OF THE INVENTION

The present invention relates to thrust bearings, and more particularly, to a combination rotating thrust plate and thrust shaft flange (10) intended to support a rotating shaft (20) in a screw extruder and to a thrust bearing assembly (40) incorporating the combination.

BACKGROUND OF THE INVENTION

Extruders generally force molten material through an extruder barrel utilizing a turning screw. During operation, the flights of the screw engage the molten material, moving it along the length of the barrel. Usually, a restriction to flow such as a die defining the desired shape for the extruder material is mounted onto the end of the barrel. The force created by the screw on the material causes it to flow through the restriction. The movement of the material via the action of the screw, as well as the channeling of the material through the restriction, tends to generate very high reaction forces that are transmitted to the device employed to drive and support the screw.

In general, the extruder screw is mounted to an output thrust shaft that in turn forms part of a gear box. The thrust shaft is usually supported by roller-type bearings with the above-described reaction force being absorbed by a thrust bearing also in communication with the thrust shaft. A thrust bearing typically consists of a series of rolling elements sandwiched between two thrust plates. The thrust plates and rollers transfer the reaction forces generated by the processing of the material through the extruder to the gear reducer housing. Due to the magnitude of the reaction force, known thrust plates are generally not stiff enough to withstand the load imposed thereon and must be replaced frequently. Extruder screw, output thrust shaft and gear box assemblies are shown in U.S. Pat. Nos. 4,304,539 (an extruder shaft supported by bearings 4 and 5 with a thrust shaft flange therebetween), 4,859,166 (an extruder shaft supported by the inner raceways of bearings and flanges), 5,545,024 (extruder shafts supported by bearings reinforced with thrust shaft flanges), and 4,033,556 (an extruder shaft supported by the inner raceways of bearings).

Additionally, thrust bearings are well known in the art. U.S. Pat. No. 3,414,341 ('341) is an example of conventional thrust bearings having retainer seals. Flat rotating and stationary plates are shown with roller or ball bearings interspersed therebetween. A bearing cage which holds the roller or ball bearings in place is also shown in '341. Conventional flat rotating plates lack the stiffness desired in extruder applications, and are reinforced by thrust flanges for such applications.

U.S. Pat. No. 4,042,284 ('284) shows a thrust bearing assembly designed to counter considerable axial thrust such as that generated by extruders. The assembly of '284 has a support, two rows of coaxially arranged bearing elements (plates) in cooperating pairs forming a line of bearings in tandem, the elements in one row rotating with the shaft and those of the other row being stationary with the support and includes tilt means that are biased by at least two adjustable bearing elements. The thrust bearing assembly of '284 is quite complicated, and is not compatible with all conventional gear box assemblies.

FIG. 1 shows a conventional gear box design which incorporates a thrust shaft flange (36) to further stiffen and uniformly distribute the thrust load over a rotating thrust plate (34) in contact with the thrust shaft (20). During operation, the direction of thrust is against the flange (36) as indicated by the arrow labeled "T" shown in FIG. 1, and the force generated from the thrust is transmitted via the peripheral lip (42) on the thrust shaft (20) to the thrust shaft flange (36) which in turn transmits the force to the thrust bearing (41). A drawback associated with the above-described flange and thrust bearing arrangement is that a separate thrust shaft flange (36) and thrust plate (34) must be provided, resulting in an increased likelihood for machining and/or assembly error as well as the possibility of localized areas of high stress due to inexact mating of the thrust shaft flange and thrust plate surfaces (35) and (37). Moreover, the requirement for a separate thrust flange (36) adds to the expense of the extruder gearbox (38). Based on the foregoing, there is a need for a one-piece, combination thrust shaft flange and thrust plate design which would eliminate the difficulties and drawbacks associated with the above-described prior art configuration, and be compatible with prior art gear boxes (38) as shown in FIG. 1.

None of the above inventions and patents, taken either singularly or in combination, is seen to describe the instant invention as claimed.

SUMMARY OF THE INVENTION

The present invention relates to a rotating combination thrust plate and thrust shaft flange (10), and to a thrust bearing assembly (40) with the rotating flange plate combination (10) incorporated therein in place of a conventional flat rotating thrust plate. This combination thrust plate and thrust shaft flange (10) preferably has a generally cylindrical body portion (22), a frustoconical body portion (29) and a bore (12) extending through the cylindrical and frustoconical body portions (22 and 29). The cylindrical body portion (22) has a rotating base surface (24) and a lateral surface (23), the frustoconical body portion (29) has a frustoconical surface (28), and the bore (12) has a first bore section (14) and a second bore section (16). The first and second bore sections (14 and 16) meet at a junction (18) defining a lip (21) which is designed to support a complimentary lip (42) of the bore shaft (20) thereby restricting the movement of the bore shaft (20) in the direction of thrust.

An advantage of the present invention is that the rotating thrust plate (34) and the separate thrust shaft flange (36), as used in prior art gear boxes (38) and shown in FIG. 1, are eliminated and a single piece rotating flange plate combination (10) is used. Fewer parts results in less expense of replacing the part and makes it is easier for the machinist to determine which parts are in need of replacement.

A further advantage of the present invention is that the rotating flange plate combination (10) has a greater stiffness, or load bearing capacity, than prior art rotating thrust plates and thrust flanges of the same material. The thrust bearing assembly (40) of the present invention also has a greater load bearing capacity.

Yet another advantage of the present invention is that the rotating flange plate combination (10) replaces the rotating thrust plate (34) and thrust flange (36) of the prior art in conventional extruders. Similarly, the thrust bearing assembly (40) of the present invention directly replaces the thrust bearing assembly (41) and thrust flange (36) of the prior art devices.

These and other advantages of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1:
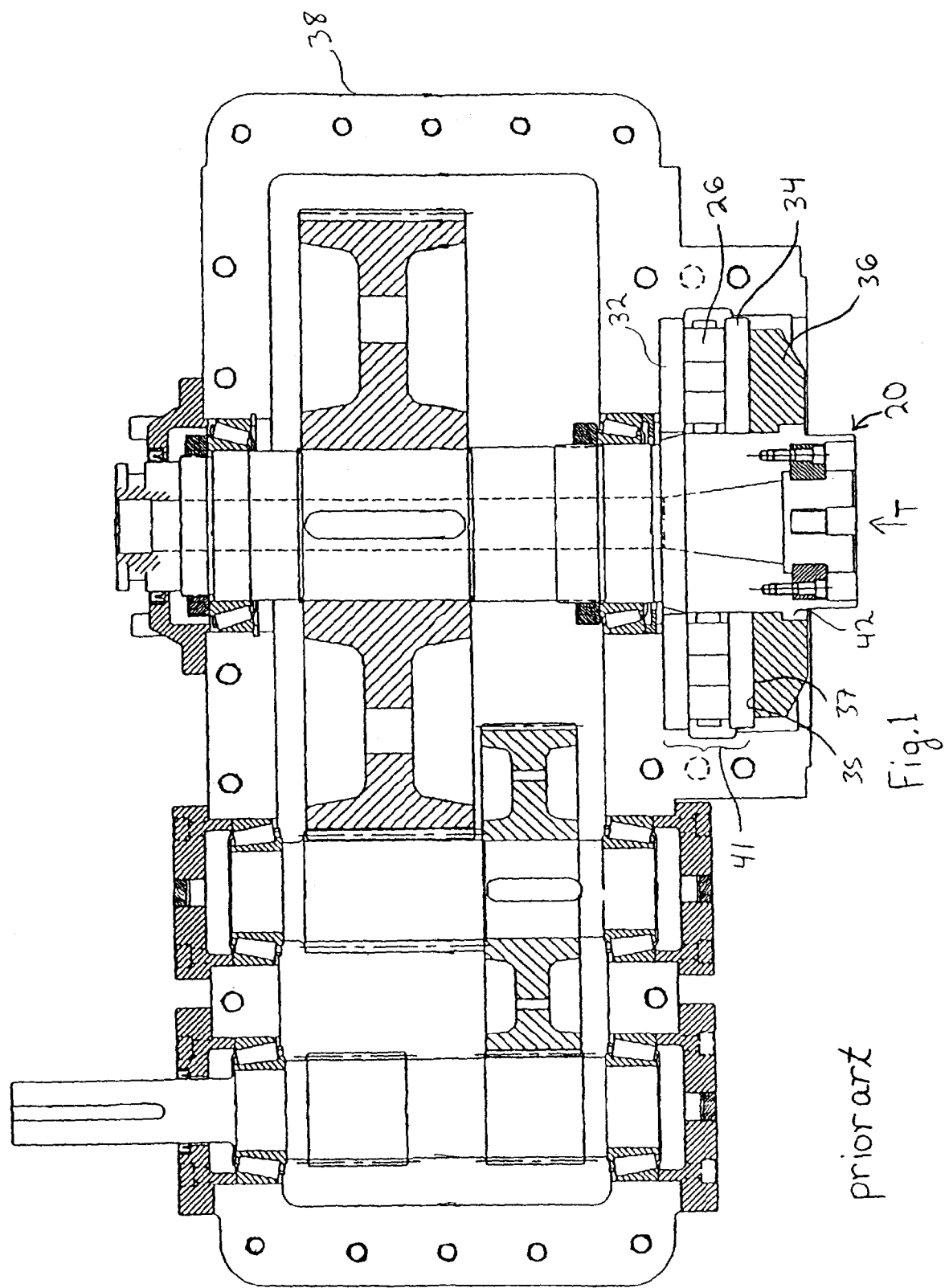
FIG. 1 a sectional side view of a conventional gear box (38) design showing a thrust bearing (41) with a rotating thrust plate (34) reinforced by a thrust shaft flange (36) of the prior art.
Figure 2:
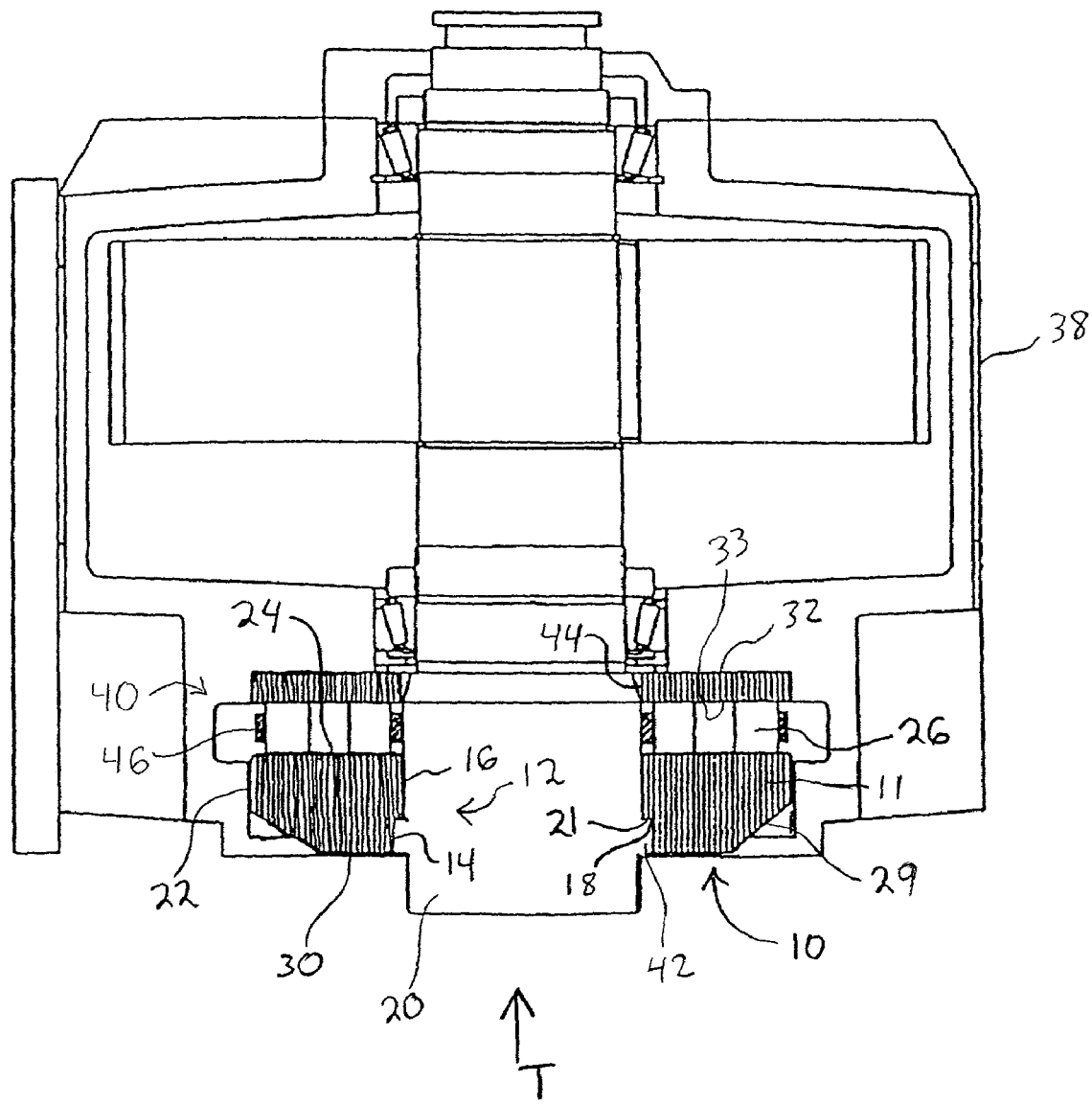
FIG. 2 is a sectional side view of an embodiment of the present invention showing a thrust bearing (40) with a combination thrust plate and thrust shaft flange (10).
Figure 3:
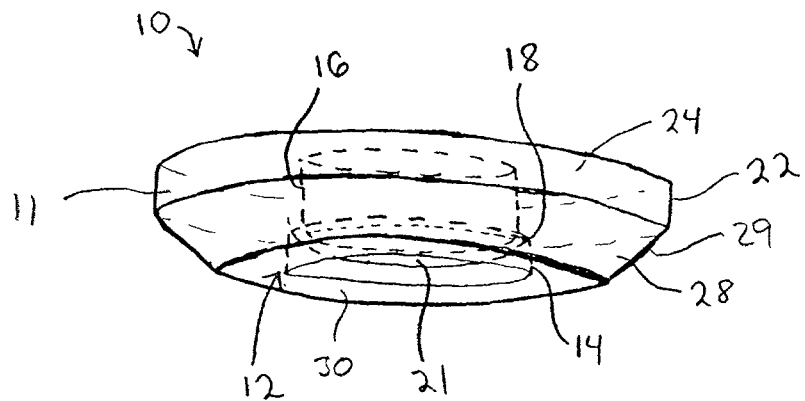
FIG. 3 is a perspective view from the bottom of a combination thrust plate and thrust shaft flange (10) according to the present invention.

As shown in FIG. 2, the present invention includes a combination thrust plate and thrust shaft flange (also referred to herein as a rotating flange plate combination) generally designated by the reference number (10). The rotating flange plate combination (10) replaces the conventional rotating thrust plate (36) and thrust flange (34) shown in FIG. 1. The rotating flange plate combination (10) has a generally cylindrical body (11) which includes a generally cylindrical body portion (22), a frustoconical body portion (29), and a bore (12) extending therethrough. The generally cylindrical body portion (22) has a rotating base surface (24) and a lateral surface (23). The frustoconical body portion (29) has a frustoconical surface (28) and a base surface (30). The bore (12) extends through the cylindrical and frustoconical body portions (22) and (29) from the rotating base surface (24) to the base surface (30) of the frustoconical body portion (29).

Figure 4:
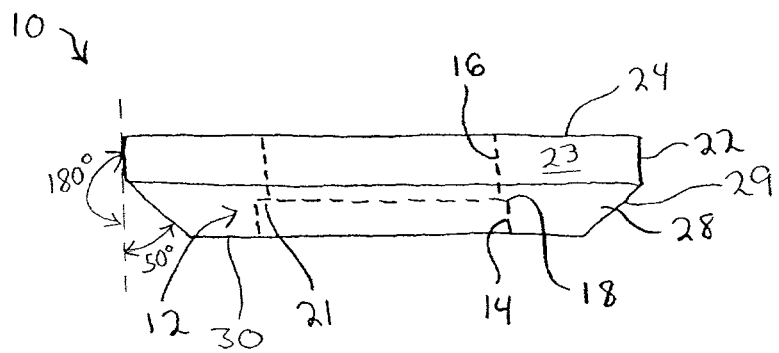
FIG. 4 is a side view of the combination thrust plate and thrust shaft flange (10) of FIG. 3.
Figure 5:
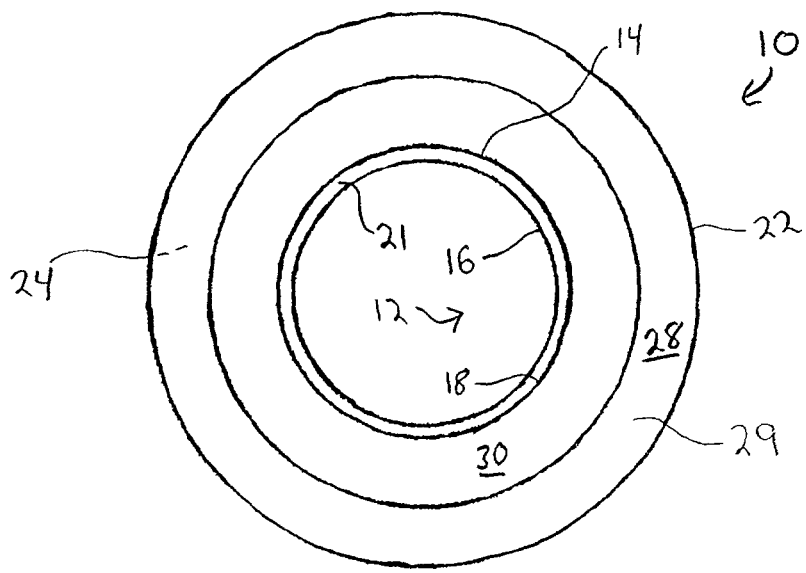
FIG. 5 is a bottom view of the combination thrust plate and thrust shaft flange (10) of FIG. 3.

As shown most clearly in FIGS. 4 and 5, the bore (12) has a first bore section (14) and a second bore section (16). The first and second bore sections (14) and (16) meet at a junction (18) thereby defining a lip (21). Preferably, the bore (12) extends substantially parallel to the lateral surface (23); however, it is critical that the bore (12) extends perpendicular to the rotating base surface (24). The second bore section (16), which is adjacent the rotating base surface (24), has a smaller diameter then the first bore section (14).

The frustoconical portion (29) extends inwardly from the generally cylindrical portion (22). Optimally, the frustoconical surface (28) extends at an angle of about 230 degrees from the lateral surface (23) as illustrated in FIG. 4. Furthermore, it is preferable that the rotating base surface (24) is adapted to engage a rolling element (26) of a thrust bearing assembly (40).

During operation, thrust forces generated by the extruder and indicated in FIG. 2 by the arrow labeled "T" are exerted against the thrust shaft (20), which in turn is coupled to an extruder screw (not shown). These thrust forces are then transmitted via a peripheral lip (42) of the thrust shaft (20) to the flange plate combination (10). The thickness of the flange plate combination (10), as well as its material of construction, will determine its stiffness or load bearing capability.

Figure 7:
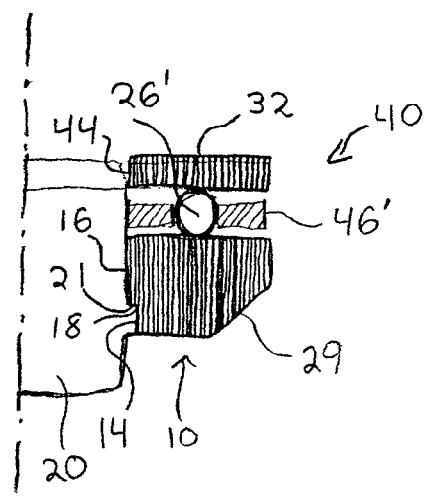
FIG. 7 is a partial, sectional side view of an alternate embodiment of a thrust bearing (40) having a rotating combination thrust plate and thrust shaft flange (10) according to the present invention.

Also encompassed by the present invention is the thrust bearing assembly (40) which supports the rotating thrust shaft (20) as shown in FIGS. 2 and 7. The assembly (40) has flange plate combination (10), a stationary plate (32) and rolling elements (26). The rolling elements (26) are evenly interspersed between the flange plate combination (10) and the stationary plate (32).

The stationary plate (32) has a generally cylindrical shape with a stationary bore (44) extending therethrough complimentary to the second bore section (16) of the flange plate combination (10). The stationary plate (32) has a stationary base surface (33). The stationary base surface (33) is adapted to engage the rolling elements (26). The rolling elements (26) are evenly interspersed between the flange plate combination (10) and the stationary plate (32).

Figure 6:
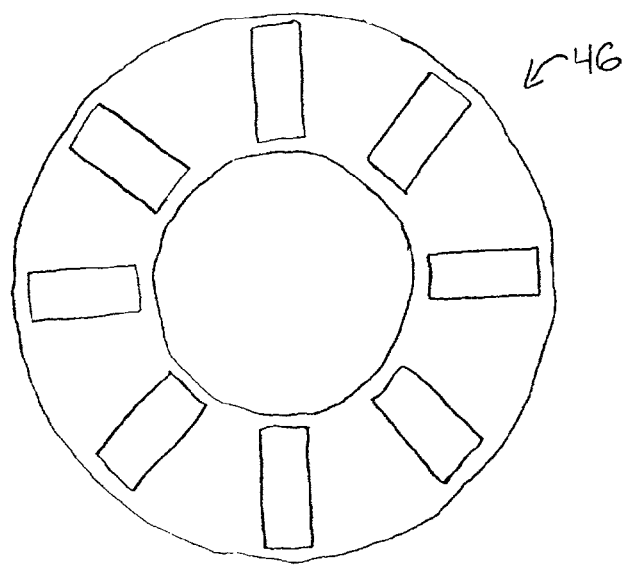
FIG. 6 is a top view of the bearing cage (46) of FIG. 1.
Figure 8:
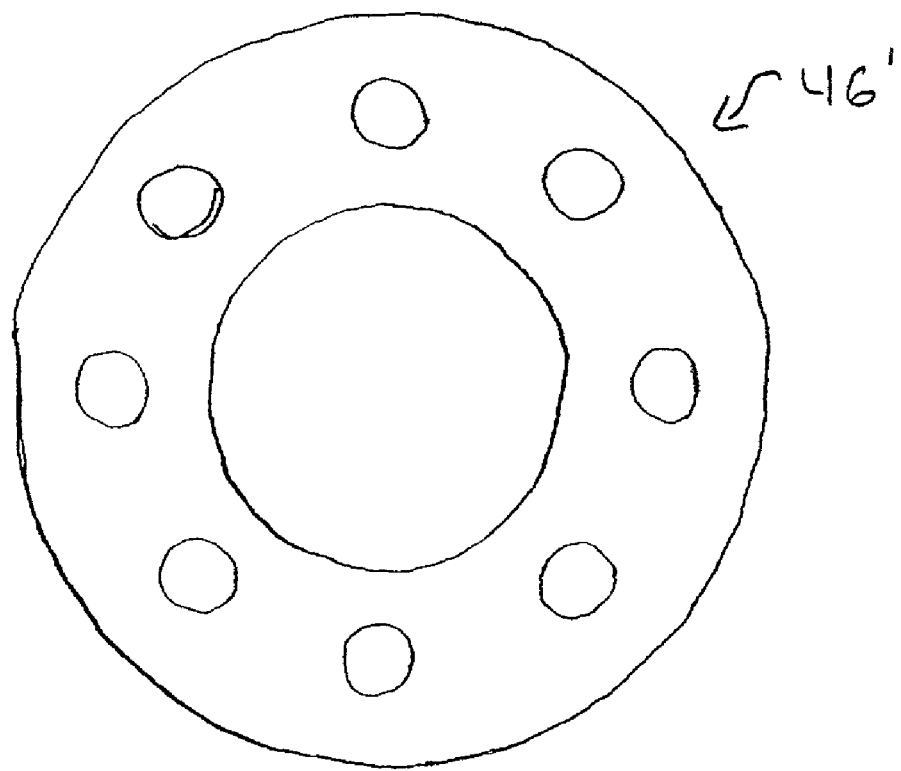
FIG. 8 is a top view of the bearing cage (46') of FIG. 7.

A bearing cage (46) for retaining the rolling elements (26) in position to assure free radial movement of the flange plate combination (10) is preferably provided. As shown in FIG. 2, the rolling elements (26) may be roller bearings. FIG. 6 shows a bearing cage (46) for retaining roller-type rolling elements (26). Additionally, ball bearings (26') and a ball bearing cage (46') may be used, as shown in FIGS. 7 and 8. It is understood that the present invention is not limited to the specific bearing cage and rolling elements shown. The bearing cages used have complimentary shapes to the shape of the stationary plate and the rotating flange plate combination used with complimentary bores extending through the bearing cage and stationary plate which is complimentary to the shape of the second bore section (16) of the rotating flange plate combination (10).

It is to be understood that the present invention is not limited to the embodiments described above, but encompasses any and all embodiments within the scope of the following claims. Accordingly, it is to be understood that the present invention has been described by way of example, and not by limitation.

What is claimed is:

1. A rotating combination thrust plate and thrust shaft flange assembly, comprising:
    a single-piece thrust plate and thrust shaft flange, comprising,
    a generally cylindrical body portion with a rotating base surface and a lateral surface,
    a frustoconical body portion with a frustoconical surface and a base surface, and
    a bore extending through said cylindrical body portion and said frustoconical body portion,
    said bore extending substantially perpendicular to said rotating base surface, said bore having a first bore section and a second bore section, said second bore section being adjacent said rotating base surface and having a smaller diameter than said first bore section, and said first and second bore sections meeting at a junction defining a lip, wherein said first bore section, said second bore section and said lip receive a thrust shaft and axial thrust forces transmitted therefrom and said lip engages said thrust shaft;
a bearing assembly directly engaged with said generally cylindrical body portion of said single-piece thrust plate and thrust shaft flange, said bearing assembly supporting rotation of said thrust shaft and comprising a plurality of rolling elements configured to accommodate axial forces; and
a stationary plate having a plate bore extending therethrough complementary to said second bore section of said bore and through which said thrust shaft is received, said stationary plate being located to engage said bearing assembly and defining a stationary base surface thereon;
a bearing cage for retaining said rolling elements in position to assure free radial movement of the single-piece thrust plate and thrust shaft flange; and
wherein said rotating base surface directly engages the rolling elements; and
said stationary base surface directly engages the rolling elements opposite said rotating base surface.

2. The rotating combination thrust plate and thrust shaft flange of claim 1, wherein the bore extends substantially parallel with said lateral surface.

3. The rotating combination thrust plate and thrust shaft flange of claim 1, wherein the frustoconical body portion has a frustoconical surface which extends at an angle of about 230 degrees from said lateral surface.

4. A combination thrust plate and thrust shaft flange comprising:
a single-piece thrust plate and thrust shaft flange having a generally cylindrical body with a rotating base surface, and a lateral surface; and
a bore extending through said cylindrical body, wherein said bore extends perpendicular to said rotating base surface, said bore having a first bore section and a second bore section, said second bore section being adjacent said rotating base surface and having a smaller diameter than said first bore section, and said first and second bore sections meeting at a junction defining a lip, wherein said first bore section, said second bore section and said lip receive a thrust shaft and axial thrust forces transmitted therefrom, wherein said lip engages said thrust shaft;
the generally cylindrical body of the single-piece thrust plate and thrust shaft flange extends up to and directly engages a plurality of rolling elements of a thrust bearing assembly;
said thrust bearing assembly having a bearing cage for retaining said rolling elements in position to assure free radial movement of the single-piece thrust plate and thrust shaft flange; and
wherein said rotating base surface directly engages the rolling elements.

5. The combination thrust plate and thrust shaft flange of claim 4, wherein:
said cylindrical body has a cylindrical body portion and a frustoconical body portion;
wherein said lateral surface is on said cylindrical body portion and said frustoconical body portion has a frustoconical surface; and
wherein said rotating base surface is adjacent said cylindrical body portion.

6. The combination thrust plate and thrust shaft flange of claim 4, wherein said bore extends substantially parallel with said lateral surface.

7. The combination thrust plate and thrust shaft flange of claim 5, wherein said second bore section extends substantially parallel with said lateral surface.

8. The combination thrust plate and thrust shaft flange of claim 5, wherein said frustoconical surface extends at an angle of about 230 degrees from said lateral surface.

9. A thrust bearing assembly for countering axial thrust, said assembly comprising:
a single-piece thrust plate and thrust shaft flange having a generally cylindrical body portion with a rotating base surface and a lateral surface, a frustoconical body portion, and a bore extending through said cylindrical and frustoconical body portions, wherein said bore has a first bore section and a second bore section, said second bore section being adjacent said rotating base surface and having a smaller diameter then said first bore section, and said first and second bore sections meeting at a junction defining a lip;
a stationary plate having a generally cylindrical shape with a stationary bore extending therethrough and a stationary base surface;
rolling elements evenly interspersed between the single-piece thrust plate and thrust shaft flange and the stationary plate, and in contact with said rotating base surface and said stationary base surface, and
a thrust shaft engaging said lip and disposed and supported for rotation within said first bore section, said second bore section and said stationary bore, said thrust shaft transmitting axial thrust forces to said single-piece thrust plate and thrust shaft flange;
the generally cylindrical body portion of the single-piece thrust plate and thrust shaft flange extends up to and directly engages said rolling elements;
a bearing cage for retaining said rolling elements in position to assure free radial movement of the single-piece thrust plate and thrust shaft flange; and
wherein said rotating base surface directly engages the rolling elements; and
said stationary base surface directly engages the rolling elements opposite said rotating base surface.

10. The thrust bearing assembly of claim 9, wherein said bore extends substantially parallel with said lateral surface.

11. The thrust bearing assembly of claim 9, wherein said frustoconical body portion has a frustoconical surface which extends at an angle of about 230 degrees from said lateral surface.

12. The thrust bearing assembly of claim 9, wherein said rolling elements are ball bearings.

* * * * *